Patented July 27, 1954

2,684,977

UNITED STATES PATENT OFFICE 2,684,977

METHOD OF PREPARING CHLOROSULFURIC ESTERS OF CHLORINATED ALCOHOLS

Marcel Jean Viard, Bois-Colombes, France, assignor to Societe Anonyme des Manufactures des Glaces et Produits Chimiques de Saint-Gobain, Chauny & Cirey, Paris, France No Drawing. Application April 12, 1951, Serial No. 220,709

Claims priority, application France April 18, 1950

7 Claims. (Cl. 260—456)

1

This invention relates to a process of making chlorosulfuric esters of chlorinated alcohols.

The raw materials employed in this case are of the type described in copending application Serial No. 133,215, filed December 15, 1949. They are the complexes formed by the reaction of $SO_2$ on epoxides, and are of determinate constitution but occur in several isometric forms. For instance, the reaction of $SO_2$ on ethylene oxide produces a series of compounds having the following formulas.

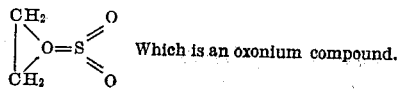

Which is an oxonium compound.

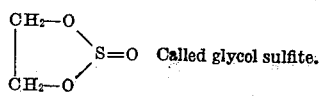

Called glycol sulfite.

$(CH_2CH_2SO_3)_n$ Called polymeric glycol sulfite.

A method of making such compounds is set forth in that specification, which may be referred to for details. It is disclosed in that application how compositions containing the epoxy group give, by the addition of sulfur dioxide, sulfidic complexes of the types described above, and that the higher homologues of ethylene oxide such as propylene and butylene oxide and their substitution derivatives such as epichlorhydrine also produce these sulfidic complexes by reaction with sulfur dioxide.

Included in these raw materials are the products formed by the reaction of $SO_2$ on the higher homologues of ethylene oxide, for example those produced by the reaction of $SO_2$ on propylene oxide and butylene oxide. Also included in the raw materials are the products formed by the reaction of $SO_2$ on derivatives of the epoxides of which epichlorhydrine is representative. The compounds are generally called complexes, of epoxides and sulfur dioxide, in this specification.

The process is carried out by chlorinating these complexes, either singly or together.

The objects of this invention are carried out, in the preferred form of the invention, by chlorinating such sulfidic complexes. The products resulting from this chlorination reaction are the chlorosulfuric esters of chloroalkyl alcohols. For instance, by chlorinating the complex of ethylene oxide one obtains the chlorosulfuric ester of beta chlorethyl alcohol, following the reaction

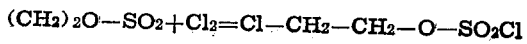

2

There are three raw materials which may be used to produce this compound, namely the polymer of glycol sulfite, the monomer of glycol sulfite and the oxonium compound shown hereinabove. Upon chlorination they all appear to yield the identical product, as indicated in the examples which follow.

In practice one passes a current of chlorine gas through the raw material, while keeping the mass at a temperature about 15° C. or preferably therebelow. This temperature is maintained by refrigeration of any satisfactory type. The reaction may be stopped as soon as the stoichiometric quantity of chlorine has been fixed in the raw material, but the flow of chlorine may be continued after that quantity has been added, without inconvenience, because there is no apparent danger, under the operating conditions, of fixing additional chlorine in the molecule of the chlorosulfuric ester that is formed.

The speed of the reaction may be accelerated by means of a chlorination catalyst and the presence of a chlorination catalyst also has the effect of improving the yield by eliminating secondary reactions. Camphor is an excellent catalyst, and ultraviolet light is also very useful. The liquid products of reaction can be purified by distillation, which in the case of the ester of ethyl alcohol, should be at reduced pressure.

Example I 108 grams of the polymer of glycol sulfite were admitted to a balloon flask provided with an agitator. Through the liquid mass there was passed a current of chlorine while the temperature was maintained at about 15° C. by exterior cooling of the flask. Agitation continued throughout the reaction. The mass was very viscous at the beginning of the chlorination but presently divided itself into two layers, one of which was viscous and the other more fluid. As the absorption of chlorine continued the more fluid layer increased in volume and the viscous layer decreased until finally there was obtained a homogeneous liquid. The chlorination was stopped after 71 to 75 grams of chlorine had been admitted and the product was distilled under a vacuum of 18 mm. of mercury. The product obtained was 95 to 110 grams of the chlorosulfuric ester of beta chlorethyl alcohol. This material boiled at 95° C. at 18 mm. of pressure. The yield was about 60%.

Example II 108 grams of the oxonium derivative of the formula shown hereinabove was admitted to the balloon flask used in Example I, with 1 gram of camphor. The flask was chilled to 5 to 10° C. during the operation and a current of chlorine was passed through the oxonium compound with agitation. When the mass had increased 75 grams in weight the introduction of chlorine was stopped and the mass was allowed to attain normal temperature. Thereafter, it was fractionated in a fractionating column by distillation at 18 mm. of mercury pressure. There was obtained 150–160 grams of the chlorosulfuric ester of beta chlorethyl alcohol, substantially identical with that which is described in Example I, in a yield representing 84 to 89%. The increase in the yield with respect to Example I was largely due to the presence of camphor as a catalyst.

*Example III*

Into a simliar balloon flask there was admitted 216 grams of monomeric glycol sulfite. The flask was maintained between 0 and 10° C., with agitation, and a current of chlorine was passed through the mass. When the mass has increased 150 grams in weight the passage of chlorine was discontinued, between 8 and 10 hours having elapsed. By exposing the reaction mass to ultraviolet light throughout the reaction the time of reaction was reduced from 8–10 hours to 5–6 hours. The raw product obtained weighed between 330 and 340 grams and was the same chlorosulfuric ester described above. The yield, using ultraviolet light, was between 92 and 95%.

From the foregoing three examples, it is observable that the three raw materials, the oxonium compound, monomeric glycol sulfite and polyglycol sulfite all yielded the same compound upon chlorination.

When the complexes produced from epichlorohydrine by reaction with sulfur dioxide are submitted to the identical process there is obtained the chlorosulfuric ester of dichloro-2-3 propyl-alcohol which has the following formula:

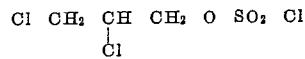

The invention may be summarized as follows:

A process of making chlorosulfuric esters of chlorinated alcohols which includes the use, as raw materials, of the sulfidic complexes derived from compositions containing the epoxy group by reaction with sulfur dioxide. In this invention such materials are chlorinated. The invention also involves the control of the reaction conditions by the maintenance of a temperature preferably below 15° C, by the use of typical chlorination catalysts and particularly by the use of camphor and ultraviolet light as catalysts.

The chlorosulfuric esters of beta chloroethyl alcohol are of substantial importance and constitute a preferred class of compounds produced by the new process.

The chlorosulfuric esters of chlorinated aliphatic alcohols are useful as intermediates for further organic reactions.

As many apparently widely different embodiments of the present invention may be made without departing from the spirit and scope thereof, it is to be understood that the invention is not limited to the specific embodiments.

What is claimed is:

1. The method of preparing a chlorosulfuric ester of a chlorinated alcohol that consists essentially in passing a current of chlorine through a pool containing about 108 parts polyglycolsulfite at a temperature of about 15° C. with agitation until about 71–75 parts chlorine have been absorbed, and distilling the product at about 18 mm. Hg pressure.

2. The method of preparing a chlorosulfuric ester of a chlorinated alcohol that consists essentially in passing a current of chlorine through a pool containing about 108 grams of the oxonium compound formed by the reaction of ethylene oxide and $SO_2$ in the presence of camphor at a temperature circa 5–10° C. until about 75 grams $Cl_2$ has been absorbed, and fractionally distilling the product at 18 mm. of Hg pressure.

3. The method of preparing a chlorosulfuric ester of a chlorinated alcohol that consists essentially in passing a current of chlorine through a pool containing about 216 grams glycol sulfite at a temperature circa 0–10° C. in the presence of ultraviolet light until 150 grams have been absorbed and fractionally distilling the product.

4. The method of preparing a chlorosulfuric ester of a chlorinated alkyl alcohol that comprises reacting chlorine with a sulfidic complex formed by the reaction of sulfur dioxide on a member of the group consisting of ethylene oxide, the higher homologues thereof, and their chlorinated substitution derivatives, at a temperature not materially higher than 15° C.

5. The process of claim 4 in which the chlorination is carried out in the presence of a chlorination catalyst.

6. The method of claim 5 in which the catalyst is camphor.

7. The method of claim 4 in which the chlorination is carried out in the presence of ultraviolet light.

References Cited in the file of this patent

UNITED STATES PATENTS

| Number | Name | Date |
|---|---|---|
| 2,497,135 | Myles et al. | Feb. 14, 1950 |
| 2,576,138 | Pechukas | Nov. 27, 1951 |

OTHER REFERENCES

Chemical Abstracts, vol. 42 (1948) page 2229, abstract of publication by Malinovski.